Mar. 3, 1925.
G. S. HALEY
1,528,419
OIL VALVE AND THE LIKE
Filed Oct. 16, 1922 2 Sheets-Sheet 2
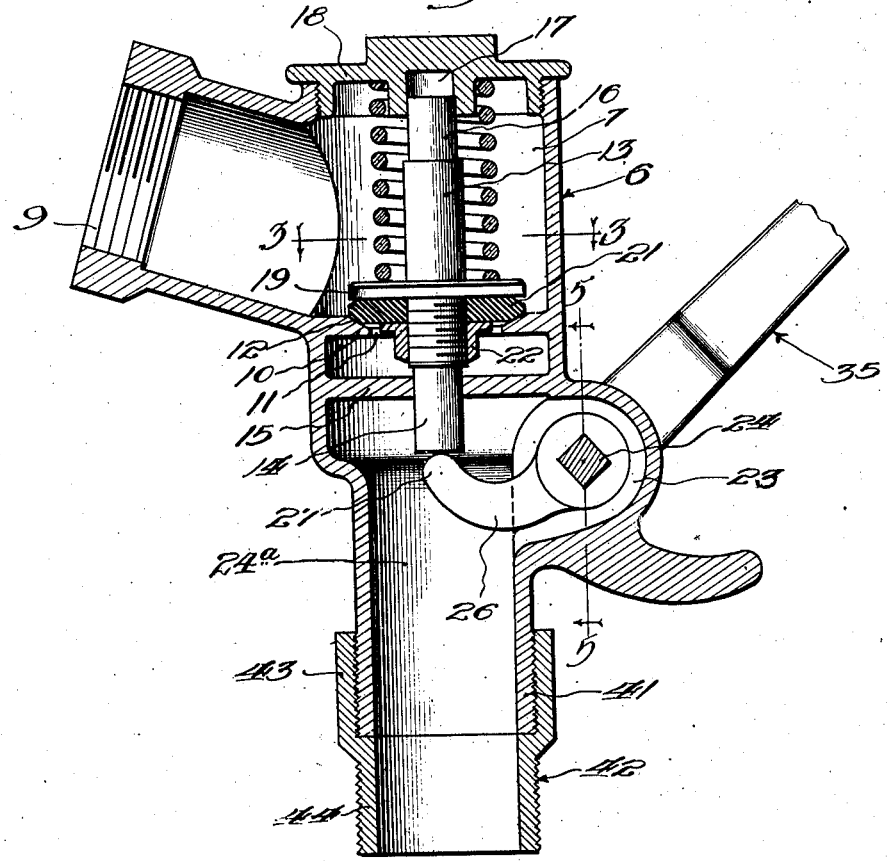
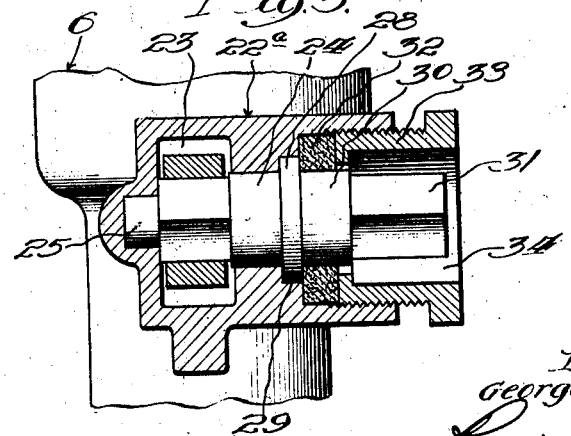
Inventor:
George S. Haley, Patented Mar. 3, 1925.

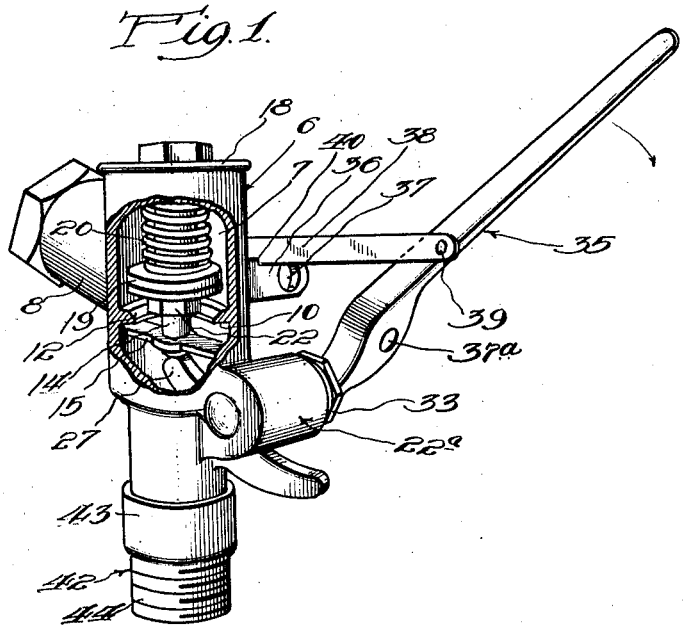
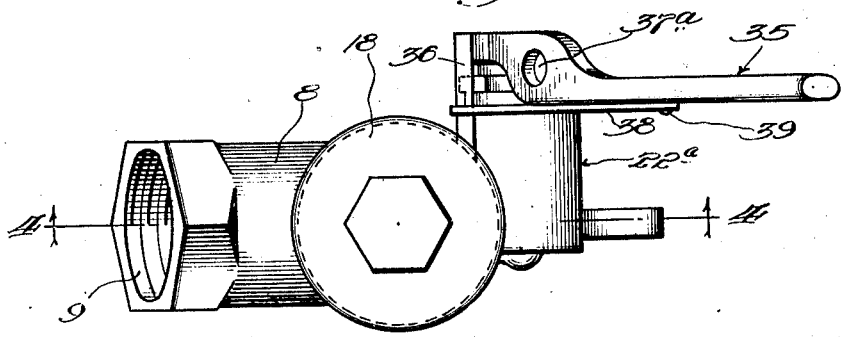
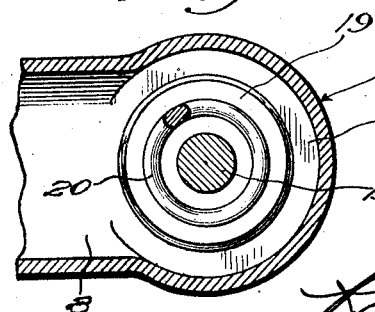

1,528,419

UNITED STATES PATENT OFFICE.

GEORGE S. HALEY, OF ROCKFORD, ILLINOIS, ASSIGNOR TO HYDE-SCHNEIDER-HALEY MFG. CO., OF ROCKFORD, ILLINOIS, A CORPORATION OF ILLINOIS.

OIL VALVE AND THE LIKE.

Application filed October 16, 1922. Serial No. 594,717.

*To all whom it may concern:*

Be it known that I, GEORGE S. HALEY, a citizen of the United States, residing at Rockford, in the county of Winnebago and State of Illinois, have invented certain new and useful Improvements in Oil Valves and the like, of which the following is a specification.

This invention has to do with certain improvements in valves. The invention has reference particularly to improvements in oil valves and still more particularly it refers to improvements in oil valves for tank wagons or similar uses.

The construction and arrangement of the valve herein disclosed have been devised with particular reference to the requirements of tank wagon service, and for this reason I have illustrated and will describe the invention as particularly used in this connection. In doing so, I wish it clearly understood that I do not intend to limit myself to this particular use of the features of the invention, except as I may do so in the claims.

Bearing the foregoing in mind, one of the objects of the invention is to provide an arrangement such that when the valve is seated or closed the liquid is entirely cut off by the valve from any contact with the stuffing box through which the shaft on which valve operating finger is mounted extends. By this arrangement the aforesaid stuffing box is not subjected to any cutting action due to the solvent qualities of gasoline and other similar liquids with which the valve may be used, and, furthermore, the leakage past this stuffing box is reduced to a minimum since the liquid only gains access to the stuffing box during the time the valve is held open to permit discharge of liquid.

A further object in connection with the foregoing is to provide a construction such that the movements of the valve may be perfectly guided, so that the valve will always come to a true seat when closed. In this connection another object is to secure this guiding action in combination with the aforementioned feature with reference to the stuffing box.

Another feature of the invention relates to the provision of a disk valve of such construction that its wearing surface may be very readily renewed; and more particularly, such that the wearing surface is provided by means of a disk of composition material which is very well adapted to make a perfect seal against any leakage of gasoline or similar highly solvent liquids. In connection with the foregoing it is a further object to make provision for the reversibility of this disk so that the useful life of the same may be practically doubled.

Another feature of the invention relates to the provision of an improved form of operating handle. In this connection it is to be noted that in the operation of valves for tank wagons and the like it is necessary to hold the valve open a considerable length of time while the liquid is being delivered to the tank of the garage or other consumer. I have, therefore, made special provision for automatically holding the valve in open position as long as may be desired to complete the delivery of the liquid so as to relieve the operator of considerable inconvenience.

Another feature is to provide an operating handle of such construction that it can be easily locked in the inoperative position in order to prevent improper use of the valve and to prevent its use by unauthorized persons.

Other objects and uses of the invention will appear from a detailed description of the same which consists in the features of construction and combinations of parts hereinafter described and claimed.

In the drawings:

Figure 1 shows a perspective view of a valve embodying the features of the present invention, a portion of the structure being broken away so as to reveal the interior construction and arrangement of parts. In Fig. 1, the valve is shown as locked in the open position;

Fig. 2 shows a plan view corresponding to Fig. 1 but on enlarged scale;

Fig 3 shows a fragmentary cross section taken on the line 3—3 of Fig. 4, looking in the direction of the arrows;

Fig. 4 shows a vertical section taken on the line 4—4 of Fig. 2, looking in the direction of the arrows; and Fig. 5 shows a cross section on the line 5—5 of Fig. 4, looking in the direction of the arrows.

The body portion of the valve is provided with a chamber 7 which communicates directly with a sidewise projecting inlet connection 8 preferably having its end interiorly threaded as shown at 9. The oil or gasoline or other liquid is thus admitted initially into the chamber 7.

In the chamber 7 below the inlet there is a partition 10 having a central circular port 11. The upper face of this circular port is beveled as shown at 12 in Fig. 1 in particular.

A vertical valve stem 13 extends centrally through the chamber 7. The lower end 14 of the stem 13 is journaled in a cross partition 15 below the position of the partition 10, so that the lower end of the stem 13 is guided at a point below the valve seat. The upper end 16 of the stem 13 works in a socket 17 of the cap 18, which cap is threaded into the upper end of the body 6 and closes the same in an oil tight fashion.

The stem 13 carries a flange 19 at a point above the partition 10, and a spring 20 surrounding the stem 13 operates between the flange 19 and the cap 18, tending to seat the valve at all times.

A valve disk 21 is located beneath the flange 19 against which it is compressed by a nut 22 threaded onto the stem 13 and of such size as to work freely through the port 11 and without materially interfering with the free delivery of oil through said port. This valve disk 21 is preferably made of fibre or other composition material which will not be readily affected by the gasoline, oil or the liquid, and which composition material will take a firm and even seat against the valve seat 12.

As shown in Fig. 4 the peripheral portion of the disk 21 is beveled so as to seat evenly against the seat 12. I have shown both the upper and lower surfaces of the edge of the disk 21 as being beveled so that said disk is readily reversible and its effective life may be doubled in this manner.

It will be observed that as long as the valve is in the seated position of Fig. 4, the lower end 14 of the stem 13 is not subjected to oil or other liquid. Consequently any operative mechanism working against said lower end will in like manner not be subjected to the influence of the liquid except when the valve is opened.

At a point beneath the position of the partition 12 is a lug 22ª at one side of the body 6. This lug 22ª is provided with an arcuate chamber 23 which communicates directly with the passage 24ª of the body member 6 below the position of the partition 10 and cross member 15. A cross pin or rock shaft 24 extends into the lug 22 and across the chamber 23 thereof, and has its end 25 journaled in the end wall of said chamber. The pin 24 is preferably squared at the point where it reaches across the chamber 23, and the operating finger 26 is set onto said squared portion and turns therewith. The end 27 of said finger 26 works against the lower end of the pin 13 so as to raise the same against the spring 20. In this connection it is observed from Fig. 4 that the lower end of the pin 13 normally stands at or near the same elevation as the axis of the cross pin 24 so that when said cross pin is rocked, the end 27 of the finger 26 will only have a very slight sliding movement on the face of the pin 13.

The pin 24 is provided with a flange 28 which sets into a recess 29 in the lug 22. The pin 24 also has a cylindrical portion 30 just outside of said flange 28, and terminating in a squared head 31. The lug 22 is provided with a stuffing box chamber spaced around the cylindrical portion 30 so that packing material 32 set into said stuffing box chamber may be forced home by means of a cap screw 33. This cap screw 33 is provided with an end recess 34 of sufficient size to accommodate a wrench set into the same for engagement with the squared end 31 of the pin 24.

It will now be evident that the stuffing box is not subjected to the action of the oil or liquid, except when the valve is opened, and even at such times the action of the oil is limited to whatever small amount may splash up into the chamber 23.

I have provided an operating handle 35 whose lower end has a key which can be set into the recess 34 of the cap screw 33 and thus engage with the squared end 31 of the pin 24. By pulling downwards on said handle in the direction of the arrow in Fig. 1, the pin 24 is rocked so as to open the valve. The parts are preferably so arranged that when the valve is in closed position, the handle stands somewhat at an angle with respect to the vertical, as shown in Fig. 4 in particular. By turning the handle upwardly it may be brought to a substantially vertical position since by such movement the finger 26 is drawn away from the pin 13.

A lug 36 reaches sidewise from the chamber 6. This lug is provided with an opening 37 and the handle 35 has an opening 37ª which will come into substantial registry with the opening 37 when the handle is raised to a substantially vertical position. A padlock may then be set through the two openings so as to lock the handle in the raised position, which corresponds to the closed valve position.

A link 38 has its outer end pivoted to the handle 35 at the point 39, and the free end of said link is provided with a shoulder 40 which will drop down in front of the lug 36 when the handle 35 is rocked for the purpose of opening the valve. In this way the valve may be held open during the process of delivering the liquid.

These valves are used largely in connection with tank wagons and similar structures in which use the threads 9 are threaded onto the tank or the discharge pipe leading therefrom. It is customary to attach a hose to the lower end 41 of the valve itself, so that gasoline, oil, or other liquid can be readily delivered into the receiving tank. For this purpose said lower end 41 is externally threaded, and the hose may be threaded directly thereon. The thread on the lower end 41 will, however, become mutilated in time, and in order to make it possible to greatly extend the useful life of the valve I have provided a nipple 42 which has its upper end 43 of sufficiently large size and interiorly threaded so that it may be threaded onto the threads of the end 41. The lower end 44 of said nipple is, however, of smaller size and is exteriorly threaded with a thread of the same size and contour as the thread on the lower end of the valve body proper. Consequently, the same hose may be connected onto the thread of the nipple as was previously connected onto the thread of the valve body proper.

In connection with the foregoing it is observed particularly that the interior thread of the upper portion 43 of the nipple is of companion form with respect to the exterior thread of the lower end 44 of the nipple.

While I have herein shown and described only a single embodiment of the features of my present invention, still I do not limit myself thereto, except as I may do so in the claims.

I claim:

1. A valve comprising in combination a cylindrical chamber having an outlet at one end and a sidewise projecting inlet connection and having a transversely extending partition, there being a central circular port in said partition, a guide member within the valve chamber below the partition, a vertically extending valve stem reaching centrally through said port and having its upper end slidably mounted in a closed end of the chamber and its lower end projecting through and slidably mounted in the guide member aforesaid, to thereby guide the valve stem in its vertical movement, a flange on the valve stem at a point above the partition, a spring normally tending to force the valve stem and flange downwards, a circular disk valve seated against the bottom face of the flange and having its upper and lower peripheral edges beveled, whereby said valve disk may be reversed with respect to the valve stem and flange to bring either face of its edge portion into operative position with respect to the valve seat, means for securing the valve disk against the flange, a transverse rock shaft extending into the chamber at a point below the guide member, a finger on the inner end of said rock shaft adapted to engage the lower end of the valve stem, and a suitable operating lever connected to the outer end of the rock shaft, substantially as described.

2. A valve comprising in combination a cylindrical chamber having an outlet at one end and a sidewise projecting inlet connection and having a transversely extending partition, there being a central circular port in said partition, a guide member within the valve chamber below the partition, a vertically extending valve stem reaching centrally through said port and having its upper end slidably mounted in a closed end of the chamber and its lower end projecting through and slidably mounted in the guide member aforesaid, to thereby guide the valve stem in its vertical movement, a flange on the valve stem at a point above the partition, a spring normally tending to force the valve stem and flange downwards, a circular disk valve seated against the bottom face of the flange, means for securing the valve disk against the flange, a transverse rock shaft extending into the chamber at a point below the guide member and to one side of the axis of the valve stem, a finger on the inner end of said rock shaft adapted to engage the lower end of the valve stem, and a suitable operating lever connected to the outer end of the rock shaft, substantially as described.

3. A valve comprising in combination a cylindrical chamber having an outlet at one end and a sidewise projecting inlet connection and having a transversely extending partition, there being a central port in said partition, a guide member within the valve chamber below the partition, a vertically extending valve stem reaching centrally through said port and having its upper end slidably mounted in a closed end of the chamber and its lower end projecting through and slidably mounted in the guide member aforesaid, to thereby guide the valve stem in its vertical movement, a circular disk valve on the stem adapted to close the port of the partition, a transverse rock shaft extending into the chamber at a point below the guide member and to one side of the axis of the valve stem, a finger on the inner end of said rock shaft adapted to engage the lower end of the valve stem, and a suitable operating lever connected to the outer end of the rock shaft, substantially as described.

4. A valve comprising in combination a cylindrical chamber having an outlet at one end and a sidewise projecting inlet connection and having a transversely extending partition, there being a central circular port in said partition, a guide member within the valve chamber below the partition, a vertically extending valve stem reaching centrally through said port and having its upper end slidably mounted in a closed end of the chamber and its lower end projecting through and slidably mounted in the guide member aforesaid to thereby guide the valve stem in its vertical movement, a disk valve on the valve stem adapted to close the port aforesaid, a transverse rock shaft extending into the chamber at a point below the guide member and to one side of the axis of the valve stem, a finger on the inner end of said rock shaft adapted to engage the lower end of the valve stem, a suitable operating lever connected to the outer end of the rock shaft and adapted to extend away from the cylindrical chamber at an angle with respect to the vertical when the valve is seated to close the port a lug on the outside of the cylindrical chamber in position to co-operate with the lever when the lever is raised into the vertical position, and perforations in the lug and lever adapted to register with each other when the lever is moved into cooperative position with respect to the lug, to thereby accommodate a padlock or the like, substantially as described.

5. A valve comprising in combination a cylindrical chamber having an outlet at one end and a sidewise projecting inlet connection and having a transversely extending partition, there being a central circular port in said partition, a guide member within the valve chamber below the partition, a vertically extending valve stem reaching centrally through said port and having its upper end slidably mounted in a closed end of the chamber and its lower end projecting through and slidably mounted in the guide member aforesaid, to thereby guide the valve stem in its vertical movement, a disk valve on the valve stem adapted to close the port aforesaid, a transverse rock shaft extending into the chamber at a point below the guide member and to one side of the axis of the valve stem, a finger on the inner end of said rock shaft adapted to engage the lower end of the valve stem, a suitable operating lever connected to the outer end of the rock shaft, a lug on the outside of the cylindrical chamber in position to co-operate with the lever when the lever is raised into the vertical position and perforations in the lug and lever adapted to register with each other when the lever is moved into co-operative position with respect to the lug, to thereby accommodate a padlock or the like, substantially as described.

GEORGE S. HALEY.